H. T. Cushman.
Calendering & Polishing.
Nº 90,733. Patented Jun. 1, 1869.
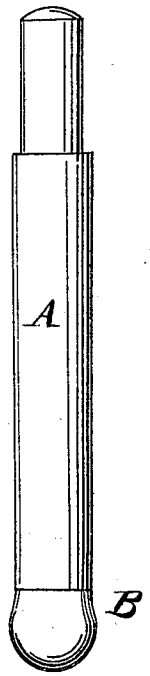
Witnesses:
O. Stinchman
Jno. R. Brooks
Inventor:
H. T. Cushman
per Munn & Co
Attorneys

United States Patent Office.

H. T. CUSHMAN, OF NORTH BENNINGTON, VERMONT.

Letters Patent No. 90,733, dated June 1, 1869.

IMPROVED COMPOSITION PAPER-POLISHER.

The Schedule referred to in these Letters Patent and making part of the same.

*To all whom it may concern:*

Be it known that I, H. T. CUSHMAN, of North Bennington, in the county of Bennington, and State of Vermont, have invented a new and improved Paper-Polisher; and I do hereby declare that the following is a full, clear, and exact description thereof, which will enable others skilled in the art to make and use the same, reference being had to the accompanying drawing, forming part of this specification.

My invention is intended to remove a difficulty experienced by all who require to make erasures of letters, words, or marks made on paper with ink, in polishing, or restoring the surface of the paper, to permit rewriting thereon without blotting.

Rosin, in its powdered state, as generally used for the purpose, will, to a certain degree, prevent the spreading of the ink, but it renders no gloss, or smoothness, and is not convenient in its application, nor does it give satisfactory results.

I propose, therefore, to provide a compound of substances as a substitute for powdered rosin, and capable of accomplishing the desired result more satisfactorily, and also capable of arrangement for use in a more convenient shape.

I melt and mix twenty (20) parts of rosin with one (1) part white beeswax, or any substance producing the effect of beeswax. The wax toughens the rosin, prevents crumbling, and produces a substance which may be conveniently handled, and which will adhere to paper. These ingredients, thus melted and mixed, may be moulded and shaped into various preferred forms for use, when solidified by cooling.

The drawing represents an elevation of one form in which this improved compound may be used.

A represents a handle, of wood, metal, ivory, or any other substance, on which, at one end, a mass, B, of this substance may be secured, in any manner, to be used in the following manner:

When erasures have been made, rub the place with the end B, and it will deposit a quantity of its substance. Then rub the place with the ivory end, C, of the instrument, or any other hard polished substance, which will harden and create a surface which may be written on without blotting, and approximating the original smooth surface of the paper.

I do not desire to limit myself to the adaptation of this compound herein shown, as any other preferred form will do as well.

Having thus described my invention,

What I claim as new, and desire to secure by Letters Patent, is—

1. The herein-described compound of matter, composed of the ingredients, mixed as specified, and adapted for polishing paper, as set forth.

2. A paper-polishing implement, composed of a handle, A, of ivory or other substance, and a mass, B, of the compound herein specified.

H. T. CUSHMAN.

Witnesses:
EDWIN McCREA,
HARLOW GREEN.